(12) United States Patent
Greco et al.

(10) Patent No.: US 10,590,247 B2
(45) Date of Patent: Mar. 17, 2020

(54) PROCESS FOR PREPARING FREE-STANDING FILMS OF CONDUCTIVE POLYMERS

(71) Applicant: FONDAZIONE ISTITUTO ITALIANO DI TECNOLOGIA, Genoa (IT)

(72) Inventors: Francesco Greco, Massa e Cozzile (IT); Alessandra Zucca, Genoni (IT); Barbara Mazzolai, Castiglioncello (IT); Shinji Takeoka, Tokyo (JP); Kento Yamagishi, Tokyo (JP); Toshinori Fujie, Tokyo (JP); Virgilio Mattoli, Vicopisano (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 350 days.

(21) Appl. No.: 15/548,656

(22) PCT Filed: Mar. 8, 2016

(86) PCT No.: PCT/IB2016/051296
§ 371 (c)(1),
(2) Date: Aug. 3, 2017

(87) PCT Pub. No.: WO2016/142850
PCT Pub. Date: Sep. 15, 2016

(65) Prior Publication Data
US 2018/0009957 A1 Jan. 11, 2018

(30) Foreign Application Priority Data
Mar. 9, 2015 (IT) ................ FI2015A0065

(51) Int. Cl.
*C08J 5/18* (2006.01)
*C08J 7/04* (2020.01)
(Continued)

(52) U.S. Cl.
CPC ................. *C08J 5/18* (2013.01); *B29C 41/32* (2013.01); *B29C 41/44* (2013.01); *B29C 41/46* (2013.01);
(Continued)

(58) Field of Classification Search
CPC . C08J 5/18; C08J 7/042; C08J 2323/12; C08J 2367/02; C08J 2401/12;
(Continued)

(56) References Cited

U.S. PATENT DOCUMENTS

2012/0306114 A1* 12/2012 Greco .................... B82Y 30/00
264/104
2013/0251977 A1 9/2013 Kim
(Continued)

FOREIGN PATENT DOCUMENTS

CN 101671443 A 3/2010
CN 102604334 A 7/2012
(Continued)

OTHER PUBLICATIONS

JP 2012-186222A Machine Translation JAP to ENG (Year: 2012).*
(Continued)

*Primary Examiner* — Joseph S Del Sole
*Assistant Examiner* — Lawrence D. Hohenbrink, Jr.
(74) *Attorney, Agent, or Firm* — Lucas & Mercanti, LLP

(57) ABSTRACT

The present invention relates to a process for the preparation of films of conductive polymers, by the technique so-called roll-to-roll, which allows to obtain free¬ standing films having advantageous features such as toughness, flexibility, ability to adhere to different substrates, a submicron thick-
(Continued)

ness and a very high ratio surface area/thickness; the present films are suitable for use in several technological applications, in particular for the development of biosensors, and in the production of flexible electronic components with large surface, suitable for wearable devices and also intended for contacting skin.

15 Claims, 6 Drawing Sheets

(51) Int. Cl.
*B29C 41/32* (2006.01)
*B29C 41/44* (2006.01)
*B29C 41/46* (2006.01)
*B29K 1/00* (2006.01)
*B29L 7/00* (2006.01)

(52) U.S. Cl.
CPC ........... *C08J 7/042* (2013.01); *B29K 2001/12* (2013.01); *B29L 2007/008* (2013.01); *C08J 2300/12* (2013.01); *C08J 2323/12* (2013.01); *C08J 2367/02* (2013.01); *C08J 2381/08* (2013.01); *C08J 2400/12* (2013.01); *C08J 2401/12* (2013.01); *C08J 2467/04* (2013.01); *C08J 2481/02* (2013.01); *C08J 2481/08* (2013.01)

(58) Field of Classification Search
CPC ... C08J 2467/04; C08J 2481/02; B29C 41/32; B29C 41/44; B29C 41/46; B29K 2001/12; B29L 2007/008
USPC ........................................................ 264/216
See application file for complete search history.

(56) References Cited

U.S. PATENT DOCUMENTS

2014/0039822 A1\* 1/2014 Logothetidis ....... H01L 51/0004
702/84
2016/0152008 A1\* 6/2016 Ogata .................... B29C 39/14
428/337

FOREIGN PATENT DOCUMENTS

| EP | 1815973 A1 | 8/2007 |
| JP | 2012186222 A \* | 9/2012 |
| WO | 2012070016 A1 | 5/2012 |

OTHER PUBLICATIONS

International Search Report and Written Opinion for International Application No. PCT/IB2016/051296 (12 Pages) (dated Jun. 15, 2016).

\* cited by examiner

PROCESS FOR PREPARING FREE-STANDING FILMS OF CONDUCTIVE POLYMERS

CROSS-REFERENCE TO RELATED APPLICATIONS

This application is a 371 of PCT/IB2016/051296, filed Mar. 8, 2016, which claims the benefit of Italian Patent Application No FI2015A000065, filed Mar. 9, 2015.

FIELD OF THE INVENTION

The present invention refers to a process for the preparation of free-standing films of conductive polymers, having a high ratio surface area/thickness that, thanks to their characteristics of flexibility, strength, ability to adhere to different substrates and optimal biocompatibility, are useful for different technological applications, in particular for the use as biosensors, or for the production of electric flexible components having a large surface and intended also for contacting human skin or for the incorporation in wearable devices.

State of the Art

In the last decades the conductive polymers have been subject to numerous studies for their interesting characteristics of stability and electric conductibility, which make them potential substitutes of the conventional inorganic conductive materials in electric and electronic devices. For these applications are particularly desirable the materials obtainable as thin films, while the conductive polymers, scarcely soluble in common solvents, are not easily manipulable to obtain conductive thin films and their dispersion and/or solubilisation is difficult due to the lack of suitable means and of easy and cheap solubilisation techniques. To overcome this problem, often these polymers are prepared in situ directly on the desired substrates, starting from the respective monomers by chemical or electrochemical processes. In this case however the subsequent removal of the film, or its transfer to other substrates, are particularly difficult, if not impossible, while for many applications films without support are required, the so called "free-standing" films.

Thanks to the high electric conductivity and exceptional chemical stability, one of the most successful conductive polymers is the poly(3,4-ethylenedioxythiophene), or PEDOT, in particular in the form of a complex with the polystyrensulphonate, or PSS (S. Kirchmeyer et al., J. of Materials Chemistry 2005, 15, 2077) available on the market as an aqueous dispersion used since long for the manufacture of conductive coatings on different substrates, as disclosed for example in EP1616893. This material is used for instance as conductive coating in optoelectronic multi-layered structures, or in electrolytic capacitors, or still as active material in transducers based on its properties of responsiveness to external physical stimuli. The high biocompatibility of this material was moreover recently proved, and allowed its application for developing microelectrodes for neural interfaces as well as for manufacturing supports for adhesion and proliferation of epithelial cells by controlling the electrochemical modulation of their surface properties [M. H. Bolin et al., Sensors and Actuators, B: Chemical 2009, 142, 451; e K. Svennersten et al., Biomaterials 2009, 30, 6257].

As concerns to the processes for preparing free-standing nanofilms of PEDOT, or of other conductive polymers, recently techniques have been described to obtain free-standing films of PEDOT or of PEDOT:PSS, but they are films of great thickness, comprised between 5-10 μm and several cm [see for instance H. Okuzaki et al., J. Phys. Chem. B 2009, 113, 11378]. In fact, these techniques mainly refer to methods of deposition of films by "solvent casting", that are intrinsically a little specific for the obtainment of films with nanometric thickness. Furthermore, the control of the thickness obtainable by these methods is difficult and not much accurate; and, even when these methods could be used after appropriate changes in order to obtain nanofilms, their release from substrate and transfer would be impossible given to their extreme fragility.

In K. S. Choi et al., Langmuir 2010, 26 (15), 12902-12908 a nanofilm is moreover described that may be released in water, consists of three alternating layers of graphene, PEDOT and graphene; but the process for its preparation is very lengthy and complicated, and very expensive in terms of materials used and of equipment. Furthermore, the use in this process of solvents and chemical reagents certainly non biocompatible, may adversely affect the biocompatibility of the nanofilm obtained, which is however not investigated in this paper.

In T. Fujie et al., Adv. Funct. Mater. 2009, 19, 2560-2568 a process is described for preparing free-standing polysaccharide nanofilms, for biomedical applications, consisting in the deposition of aqueous solutions of a polysaccharide, such as chitosan and sodium alginate, by spin-coating directly on a $SiO_2$ support, followed by the deposition of a layer of polyvinyl alcohol (PVA) by "drop-casting". The bi-layer film made of the polysaccharide and PVA is then detached from the $SiO_2$ support with tweezers and immersed in water wherein the PVA layer dissolves releasing a polysaccharide nanofilm. In this paper no reference is made of intermediate layers between the support for the growth of $SiO_2$ and the polysaccharide layer, or of conductive polymers, and in general it is not mentioned the possibility to use a similar method for producing nanofilms of polymers different from the exemplified polysaccharide polymers.

A similar method was also described by Stroock et al., Langmuir, 2003, 19, 2466-2472, wherein the polyacrylic acid (PAA) was used as water-soluble sacrificial layer to replace polyvinyl alcohol (PVA), for the deposition on a multilayer film where many different polymers were cross-linked and deposed on a printed support. The surface of the films obtained by this process was of very small size.

As far as the Applicant is aware, the only easy and relatively inexpensive process developed until today for the preparation of free-standing nanofilms of conductive polymers, in particular of PEDOT, also suitable for biomedical applications thanks to their biocompatibility, is that disclosed in the International patent application published with the number WO 2012/070016, in the name of the Applicant. The same inventors have then described further advances in the process of preparation of these nanofilms and in the creation of patterns or patterning (see for instance Greco F. et al., ACS Applied Materials & Interfaces, 2013, 5, 9461-9469; or Zucca A. et al., MRS Online Proceedings Library, 2013, 1530). It was moreover proposed the application of the nanofilms prepared according to the process described in WO 2012/070016 as sensors of humidity (S. Taccola et al., ACS Applied Materials and Interfaces, 2013, 5, 6324-6332) and as microactuators (S. Taccola et al., J. of Micromechanics and Microengineering, 2013, 23, 117004).

Despite the several possible applications of these nanofilms, the process described in WO 2012/070016 has intrinsic limitations in scaling up the manufacture of nanofilms, originating in particular by the fact that the process is based on the spin-coating technique. If on one hand this technique allows a highly uniform and controlled deposition of polymers to obtain layers of nanometric thickness, on the other hand the technique is only applicable to rigid substrates (or to flexible substrates that are however necessarily attached to a rigid support), of reduced size and typically of circular shape; for instance the "wafers" used as substrates in the spin-coating techniques in the current plants for the manufacture of semiconductors have a maximum diameter of 300 mm, with the possibility in the near future to get to 450 mm.

Moreover, the productivity of the spin-coating process decreases with the increase of size of the substrate. Large substrates cannot be subject to spin-coating at sufficiently high speed so as to allow the film to dry rapidly, and this is detrimental to the productivity of the process. Furthermore, one of the major disadvantages of the spin-coating technique is in its scarce efficiency with respect to the amount of materials used: only 2-5% of the starting material used is actually distributed on the substrate, whereas the remaining 95-98% goes on the walls of the container and it is thrown away. Finally, the spin-coating technique has all the implications and disadvantages of the non-continuous processes in terms of requirements for the management of the process.

It is on the contrary highly felt in the field the need to obtain conductive films of large size and ultra-small thickness by scalable processes, possibly based on continuous techniques, having high productivity, that are able to enhance the performances of the known processes based on the spin-coating technique overcoming the drawbacks highlighted above.

A technique known for its high productivity and also useful on a large scale, is the so-called roll-to-roll technique, sometimes indicated for brevity as R2R, also in the following. This technique is used in particular in the field of the electronic devices for their preparation on rolls of flexible plastics or of metal sheets, with huge benefits, above all in terms of costs, with respect to the traditional manufacturing techniques, whereas in other fields the R2R technique may be used for the deposition of coatings, the printing or other similar processes starting from a roll of flexible material and rewinding it after the process to obtain an outlet roll. As far as the Applicant is aware, until today the R2R technique was never used for the preparation of films of conductive polymers, which are free-standing and ultra-thin, in particular films of sub-micrometric thickness.

SUMMARY OF THE INVENTION

Now the Applicant has found a continuous process based on the roll-to-roll technique, which is simple and inexpensive, highly productive, and allows preparing free-standing films, of large surface and sub-micrometric thickness, constituted by films comprising a layer of one or more conductive polymers having high electric conductivity. This layer can be possibly coupled with a layer, acting as an insulating support, of one or more scarcely conductive polymers, which are tough provided with good mechanical properties.

These films generally present a very high ration surface area/thickness, they are flexible and robust, ultra-conformable and provided with high adhesiveness on any kind of surface; they are moreover highly stable and easily manipulable in the air, in aqueous environment or in biological fluids, where they can be released and then possibly transferred on target surfaces for the most different applications, including those in biomedical field, such as for the development of biosensors and of other electronic devices intended for contacting the skin, and for the application in the manufacture of flexible electronic devices of large surface area.

Subject of the invention is therefore a process for the preparation of free-standing films of conductive polymers, as defined in the first of the attached claims.

Further subjects of the invention are an intermediate in the process for preparing free-standing films of conductive polymers, and its use in the preparation of these films, as defined in claims 17 and 18 here attached.

Further important characteristics of the process and of the films according to the present invention are defined in the dependent claims here attached.

BRIEF DESCRIPTION OF THE DRAWINGS

Further features and advantages of the process and of the films according to the invention will be evident from the following description of exemplary, non-limitative embodiments thereof with reference to the attached Figures, wherein:

the FIG. 1 is a schematic representation of the present process based on a R2R technique for the preparation of films of conductive polymers on a flexible temporary support, starting from aqueous solutions of the same conductive polymers;

Figure 2:
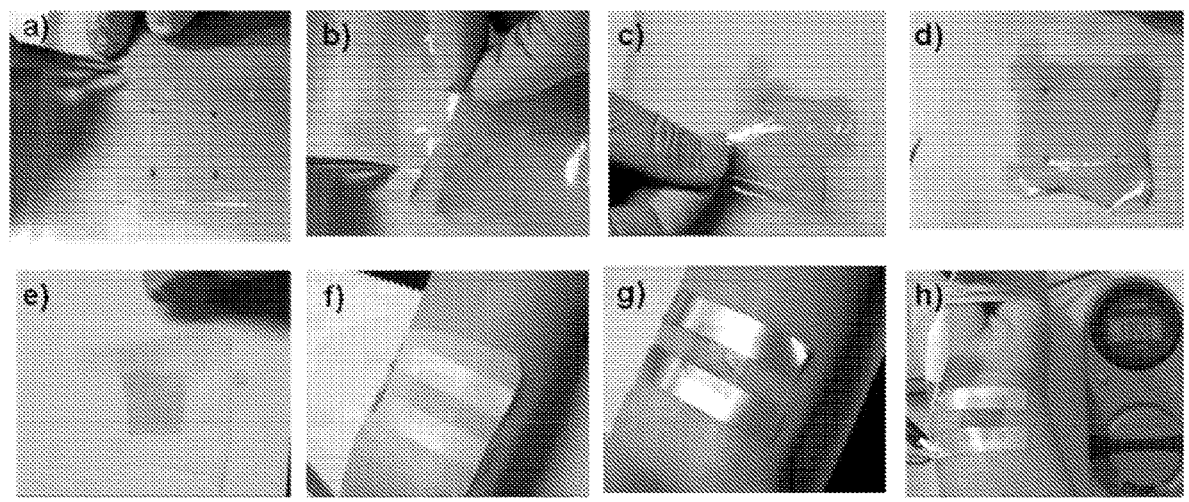
Figure 3:
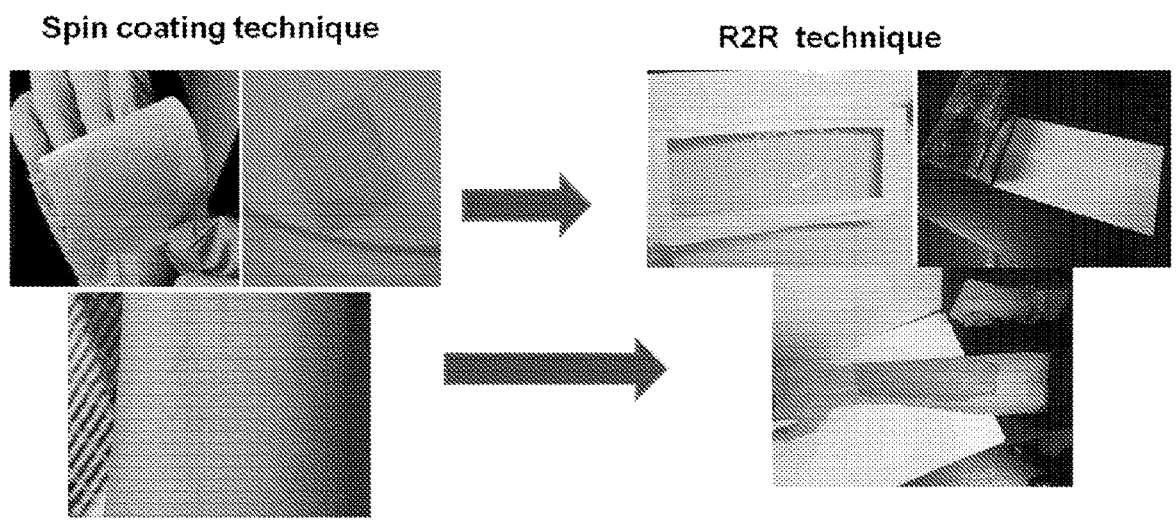
Figure 4:
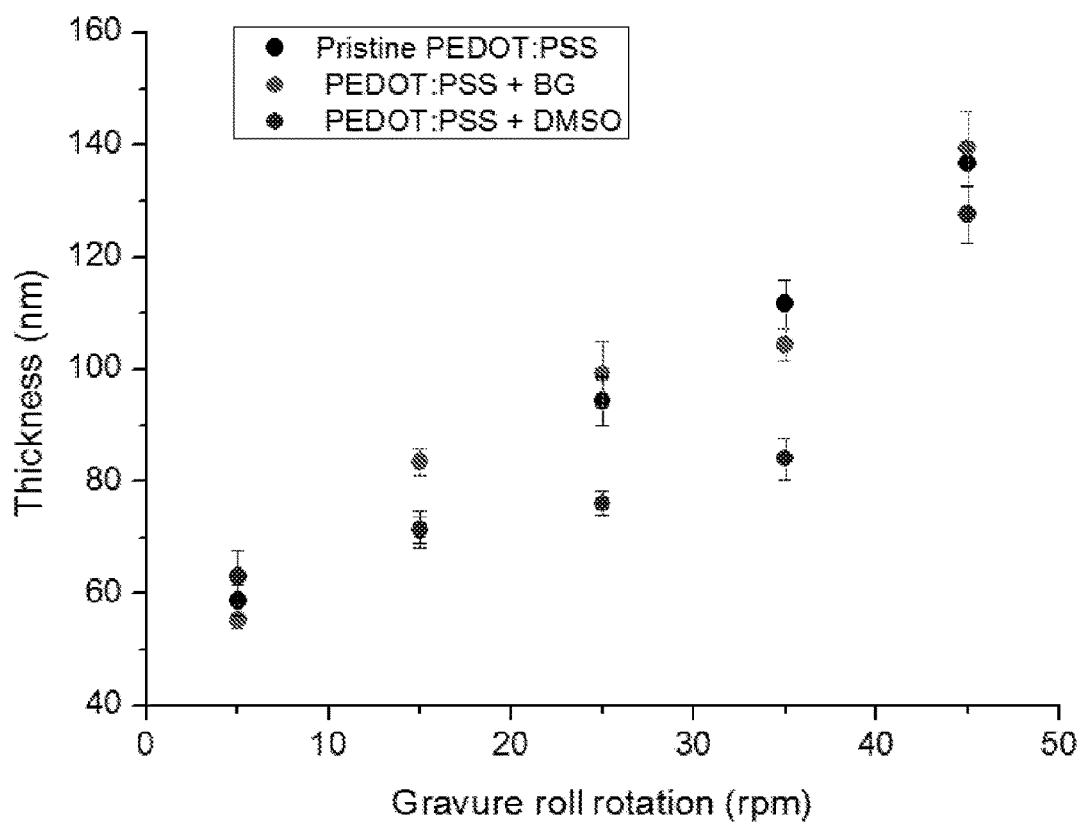
Figure 5:
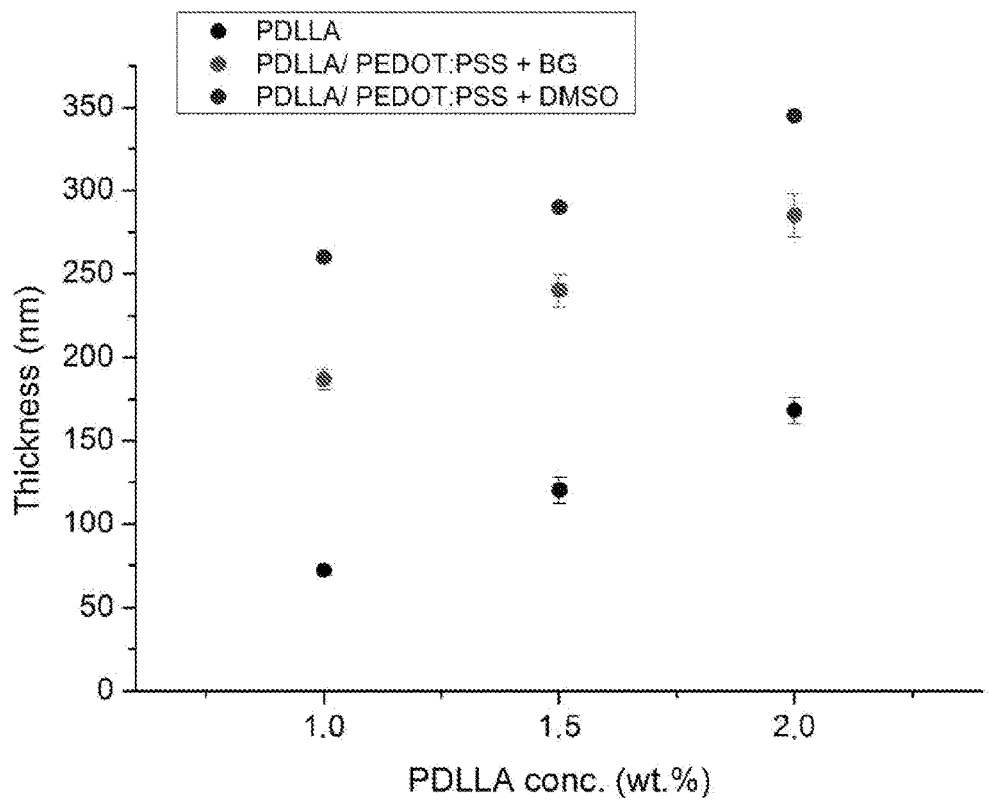
Figure 6:
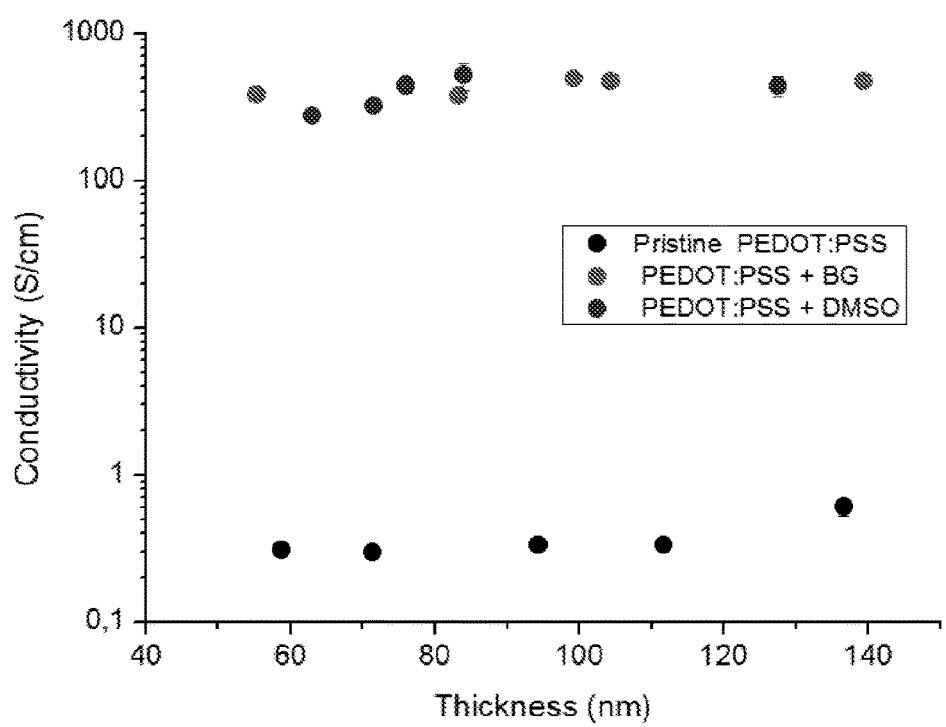
Figure 7:
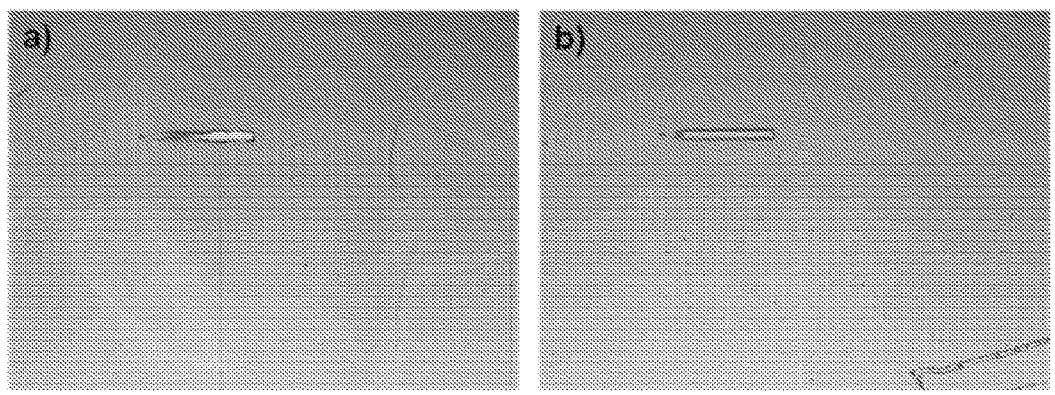
Figure 8:
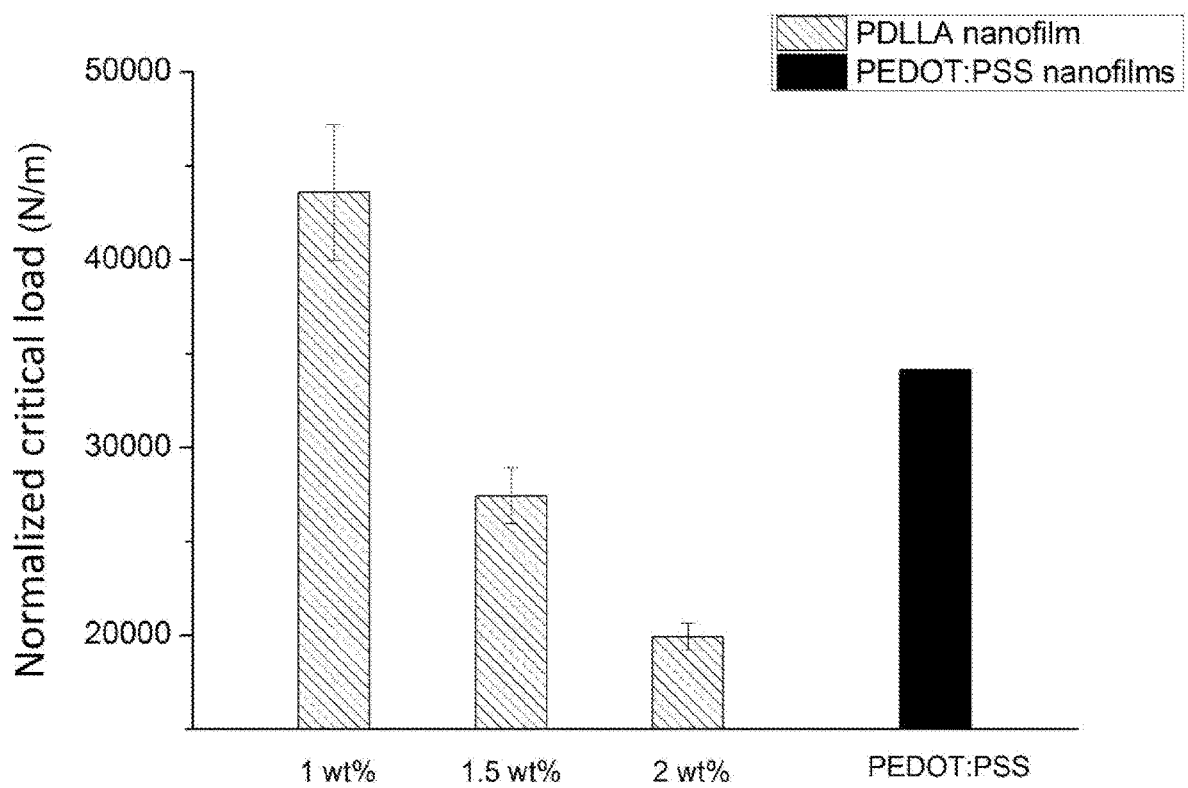
Figure 9:
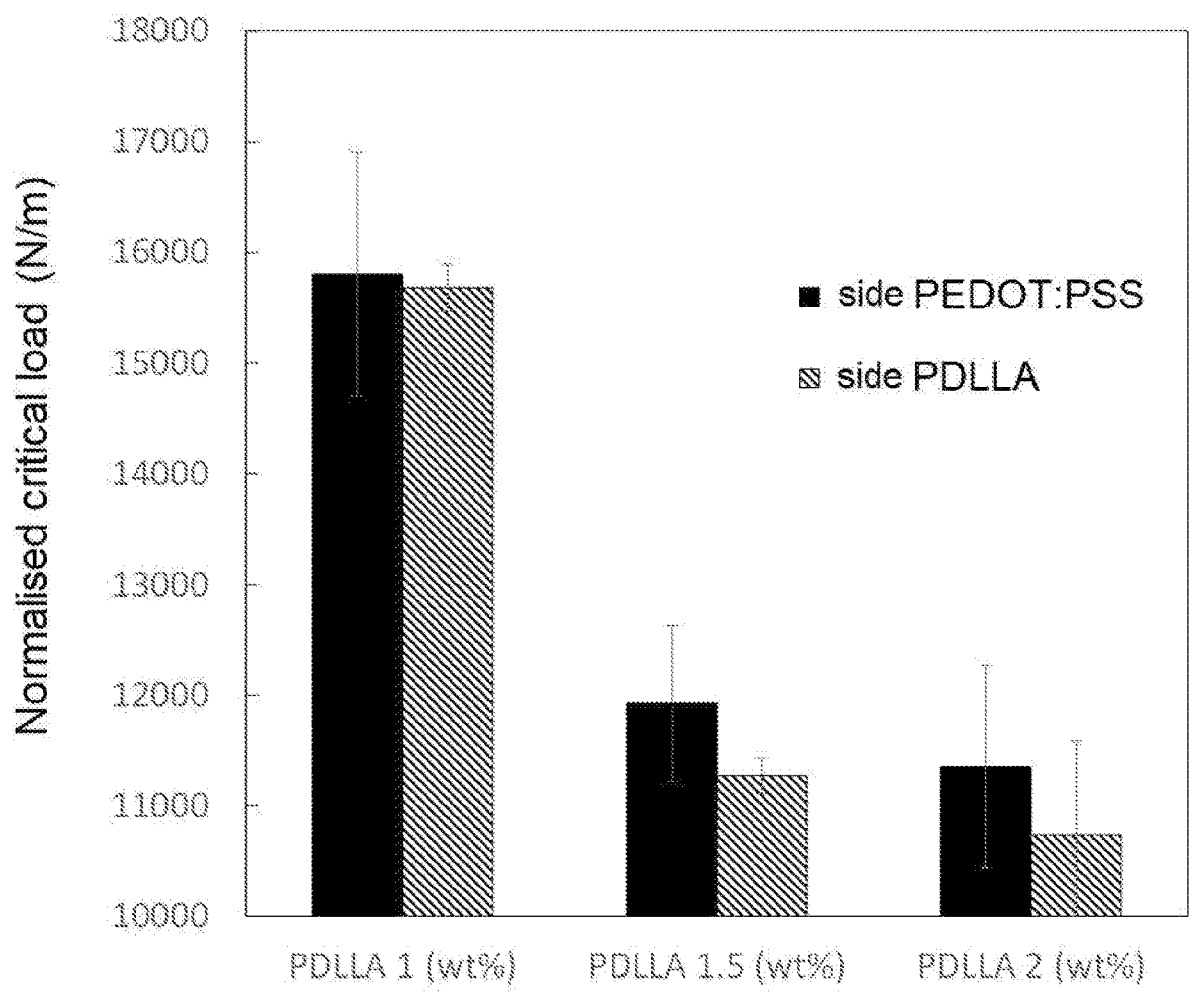
Figure 10:
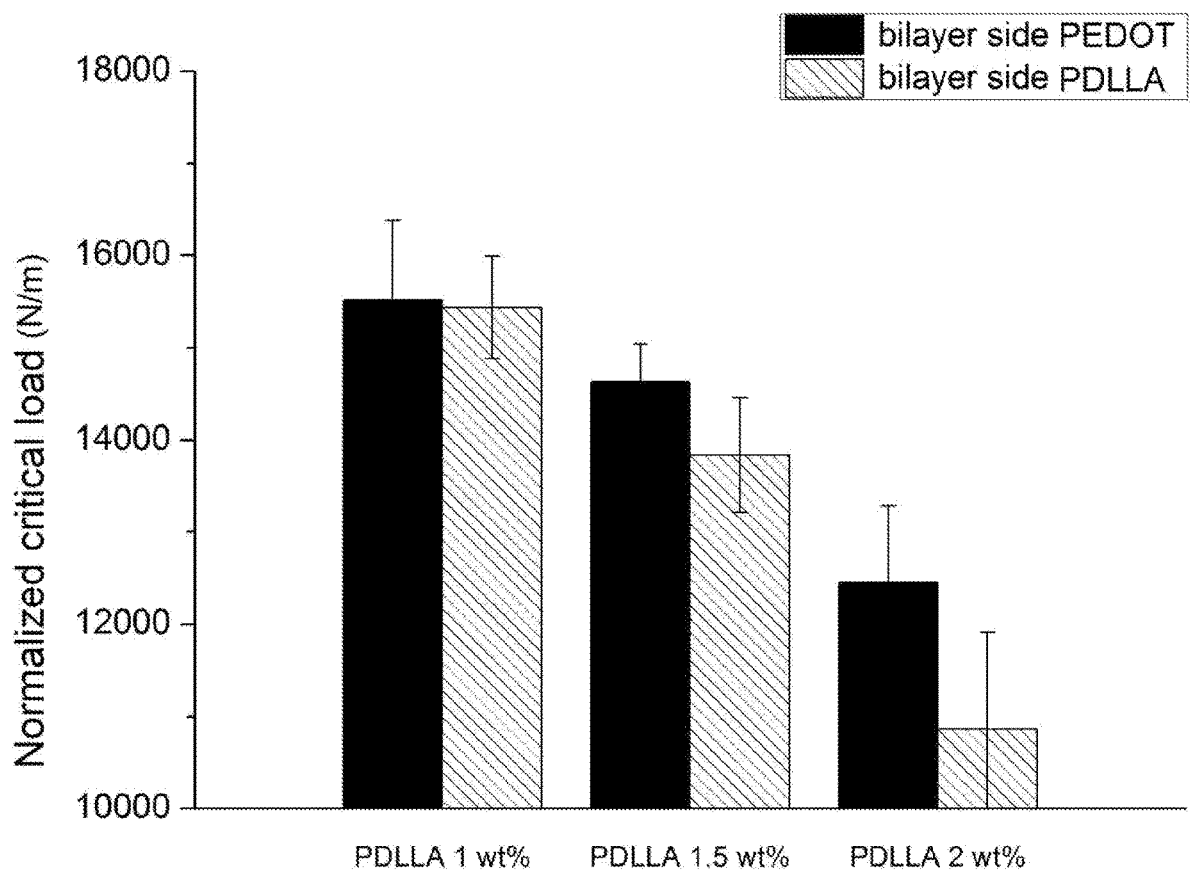

the FIG. 2 shows in a photographic sequence what follows:

a), b) the operations of detaching from a substrate of poly(propylene) (in the following "PP"), by using tweezers, a bi-layer film of poly(3,4-ethylenedioxythiophene) polystyrene sulphonate (in the following "PEDOT:PSS") and poly(D,L-lactic acid) (in the following "PDLLA") prepared as described in the Example 2, c) the above said free-standing bi-layer film on a piece of adhesive tape, d), e) the operations of transfer of the above said bi-layer film on a piece of nylon canvas, f), g), h) the operations of transfer of the above said film from the piece of nylon canvas on the arm's skin of a person, with the film connected by two copper electrodes to a voltmeter to measure resistance;

the FIG. 3 shows in two series of pictures side by side the films obtained by the process described in WO 2012/070016 (on the left side) and the films obtained by the process of the present invention (on the right side);

the FIG. 4 shows the trend in the values of thickness measured for three series of mono-layer films of conductive polymers pure and doped with two different doping agents, with the variation of the speed of rotation of the gravure roll during the R2R deposition, according to the Example 1 illustrated in the following. The values indicated with -•- refer to the data obtained for the films of pristine PEDOT:PSS, the values indicated with -o- refer to the films of PEDOT:PSS doped with 1,3-butanediol (or butylene glycol, in the following "BG") and the values indicated with -□- refer to films of PEDOT:PSS doped with dimethylsulphoxide (in the following "DMSO");

the FIG. 5 illustrates the trend in the values of thickness measured for three series of films of PDLLA (comparison) and of PEDOT:PSS and PDLLA (present invention) prepared with the process of deposition R2R, as a function of the different concentrations of PDLLA used, according to the Example 2 illustrated in the following. The values indicated with -•- refer to the data obtained for the films of PDLLA, the values indicated with -o- refer to the films of PEDOT:PSS and PDLLA doped with BG and the values indicated with -□- refer to the films of PEDOT:PSS and PDLLA doped with dimethylsulphoxide (in the following "DMSO");

the FIG. 6 illustrates the trend in the values of conductivity a measured according to what described below in the Example 4, for three series of monolayer films of conductive polymers pure and doped with two different doping agents, with variations of the thickness measured for the films. The values indicated with -•- refer to the data obtained for the films of pristine PEDOT:PSS, the values indicated with -o- refer to the films of PEDOT:PSS doped with BG and the values indicated with -□- refer to the films of PEDOT:PSS doped with DMSO;

the FIG. 7 shows two images obtained in a scratch-resistance test, described in the following Example 5: in the part a) of the figure shown is an image detected for a monolayer film of non-doped conductive polymers, adhered on a silicon wafer, and in the part b) the image is shown that was detected for a bilayer film on the side PDLLA;

the FIG. 8 illustrates in form of an histogram the values of critical normalized load obtained in the test of the Example 5 for bilayer films of the Example 2 on the PDLLA side at a different concentration and thickness (striped rectangles) and for a monolayer film of PEDOT:PSS of the Example 1 (black rectangle);

the FIG. 9 and the FIG. 10 illustrate in form of histograms the values of critical normalized load obtained in the test of the Example 5 for bilayer films of the Example 2 wherein the layer of conductive polymers is respectively doped with BG (FIG. 9) and with DMSO (FIG. 10), placing side by side the values of critical load obtained for the two sides of a same film, with the doped side of PEDOT:PSS represented by the black rectangle and the PDLLA side by the striped rectangle.

DETAILED DESCRIPTION OF THE INVENTION

The process of the invention allows the preparation of free-standing mono- or multi-layer films, ultra-conformable and flexible, having sub-micrometric thickness, comprising at least a surface layer of conductive polymer, that are released from a temporary substrate constituted by a roll of film on which they were deposited, starting from their aqueous solutions, with the "roll-to-roll" technique (in the following also indicated as "R2R"), a technique known in the art and used in particular in the field of the manufacture of semiconductors for preparing electronic devices on a roll of flexible plastic or on metal sheets. The so prepared films can then be used as such for instance as biosensors or be used after transfer on any surface for example in applications of wearable or skin-contact electronics. The use of the R2R technique makes the present process scalable and highly productive in terms of yield of the product with respect to the amount of starting materials used, and moreover allows to carry out a continuous process, with great advantages also with respect to the preparation process described in the previous patent application No. WO 2012/070016 in the name of the Applicant.

By the R2R technique in the process of the present invention are carried out both the deposition of a layer of a first polymer on a temporary support, and the deposition, on the so obtained film, of a layer of a second polymer, that is a conductive polymer. More in particular, the present process comprises the following steps:

a) deposition of a layer of a first polymer on a temporary support in form of a film by roll-to-roll technique using a solution of the first polymer, and drying of the so obtained film consisting of said temporary support and said layer of a first polymer;

b) deposition of a layer of a second polymer on said film obtained in step a) by roll-to-roll technique using an aqueous solution or dispersion of the second polymer, that is a conductive polymer, and by drying of the so obtained film consisting of the temporary support, a layer of the first polymer and a layer of the second polymer;

c) detachment of the temporary support from the film coming from the step b) by dissolving the layer of a first polymer by immersion in a solvent with release of a free-standing mono-layer film of the conductive polymer, or by detachment of the temporary support from the layer of a first polymer with release of a free-standing bi-layer film of the first polymer and of the second conductive polymer.

Figure 1:
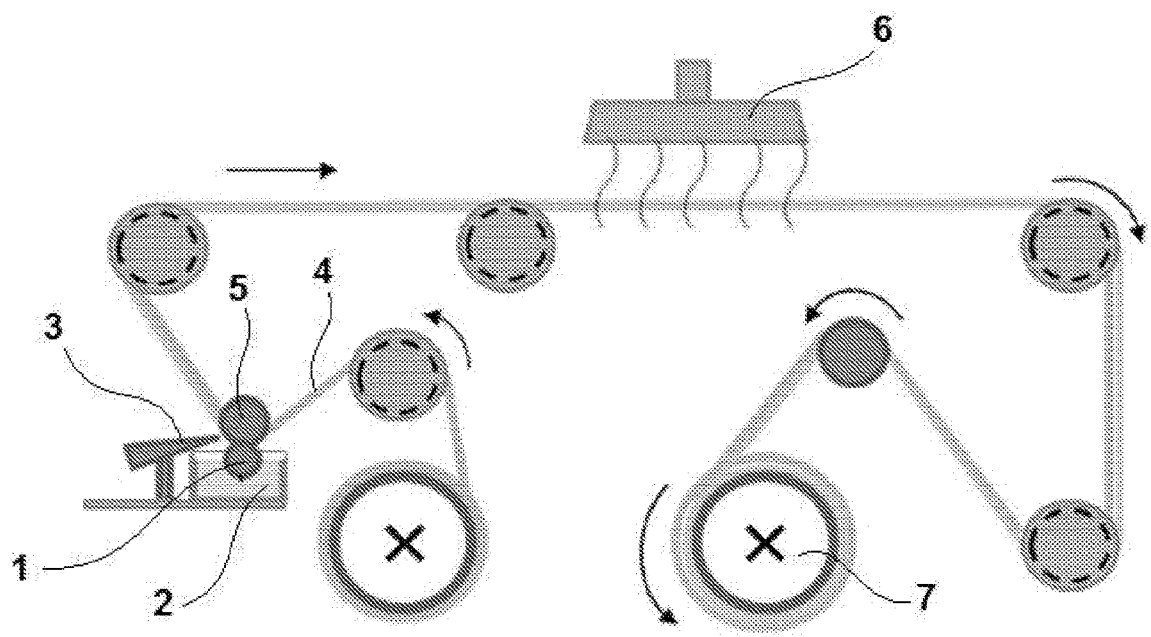

By the R2R technique the polymers are deposed in form of a solution on a film support by using a gravure roll. In the annexed FIG. 1 is illustrated a schematic representation of the deposition process used in the process of the invention and based on the R2R technique, wherein the gravure roll 1 is partially immersed in the polymer solution 2 and, rotating at a rotation speed comprised for example between 5 and 45 rpm, drags part of the polymer solution on a support film 4, whereas a blade 3 pushes and scrapes the roll before it comes in to contact with the support film so as to remove a possible excess of polymer. Then the support film 4 is let to run between this gravure roll and an impression cylinder 5, which exerts a force and pushes the support film to contact the gravure roll, thus allowing to transfer the polymer solution on the support film.

According to a particular embodiment of the present process the deposition of the layer of a conductive polymer is carried out by using a gravure roll whose surface has engravings according to a predefined pattern, so as to obtain the same pattern printed on the layer of the conductive polymer. This possibility of the present process has the advantage of producing films already printed, without the need of subsequent workings to create printed patterns on the film already prepared with uniform surfaces.

In the R2R processing line at least a hot air jet dryer 6 is included that carries out a thermal treatment of the polymer deposed on the support film for its drying, thus obtaining a dry, homogeneous film, of the polymer deposed on the support film, which is finally regained by winding on a coil 7.

The drying of the films formed by R2R technique in step a) and in step b) of the process above allows the evaporation of the solvent used for preparing the solutions of the polymers to be deposed, and it is preferably carried out respectively at a temperature of about 80° C. and of about 130° C., this latter drying phase being moreover followed, in a particular embodiment, by a further thermal treatment in oven at temperature comprised between 110 and 140° C., depending on the type of polymers used. This embodiment allows to obtain a final film wherein the layer of conductive polymer was thermally treated in oven to increase its conductivity and insolubility in water whenever the line of the R2R plant is not sufficiently long as to allow a drying protracted enough. With a sufficiently long industrial line, the present process allows to obtain the film of conductive polymer, dried and hardened, in an estimated time ranging between 60 and 180 seconds depending on the temperature with the only dryer along the line, without the need of the thermal treatment in oven.

With the process of the invention it is possible to produce free-standing mono-layer films of sub-micrometric thickness consisting of the sole layer of conductive polymer, by joining to the R2R deposition of the layers the technique so-called of the sacrificial layer (or Sacrificial Layer Technique) for the preparation of polymer films. In this case the first polymer deposed on the temporary support is a polymer that may be easily dissolved in a common solvent, thus provoking the detachment of the temporary support from the layer of conductive polymer. According to a preferred embodiment, as first polymer is chosen cellulose acetate, which may be dissolved in acetone for the detachment from the film.

As temporary support in step a) of the present process are used for example a film of poly(propylene) (or abbreviated PP), a film of poly(ethylene terephthalate) (or PET), or a film of poly(ethylene naphthalate) (or PEN). According to a preferred embodiment of the present process as temporary support are used PET or PEN that, given their greater thermal stability to the temperature for the drying/hardening of the conductive polymer, allow to carry out such step at higher temperatures than those indicated above for shorter times.

With the process of the invention it is also possible to produce free-standing bi-layer films, of sub-micrometric thickness, consisting of the layer of conductive polymer coupled to a layer of a first non-conductive polymer, which may be for example poly(D,L-lactic acid) and is mechanically separated from the temporary support by means of the use of adhesive tapes placed at the ends of the film, without requiring any solvents. According to a preferred embodiment of the present process, when the first polymer is poly(D,L-lactic acid), the temporary support is made with poly(propylene), from which the detachment in step c) of the process is facilitated. The solution of poly(D,L-lactic acid) used in step a) of the process for the deposition of the film by R2R is a solution in acetone of the polymer having a concentration ranging preferably between 1 and 2% by weight with respect to the total weight of the solution.

According to a preferred embodiment of the present invention a surfactant is added to the solution of conductive polymers in step b) of the process in order to reduce the surface tension of the solution and favouring the surface wettability of the support, obtaining a more homogeneous and thin film also on large surfaces; furthermore the presence of a surfactant favours the mixing of the conductive polymers with the doping agent, when present. Examples of surfactants suitable for use in the present solutions of conductive polymers are non-ionic fluorosurfactants, or anionic surfactants, such as sodium dodecyl benzene sulphonate or sodium lauryl sulphate, typically used in amount comprised between 0.01 and 1% by weight with respect to the total weight of the solution, and up to a maximum amount of 10% by weight. The addition of the surfactant has allowed to obtain an homogeneous film of great size also without the need to carry out plasma treatments or other surface treatments, feasible on a laboratory scale, but not scalable in a process based on a continuous technique of the type R2R.

The process of the invention may be implemented using any conductive polymers or mixtures/complexes of conductive polymers, provided that they are available in the form of aqueous solution or dispersion. Suitable conductive polymers are selected for example among the so-called "conjugated polymers" or "intrinsically conductive polymers" (ICP), polymers constituted by molecules with conjugated bonds whose conductibility is due to the particular structure, optionally complexed with suitable dispersants in order to render them available in the form of aqueous dispersion. Examples of these polymers include polypyrrole, polythiophene, polyaniline, and derivatives thereof. For their characteristics of high durability, high conductivity and availability on the market of commercial formulations optimized for coating and printing processes, the polythiophene and its derivatives are the preferred conductive polymers according to the invention.

These conjugated polymers can have one or more substituents, equal or different between each other, selected for example in the group consisting of alkyl, alkenyl, alkynyl, alkoxy, alkylthio, and amino groups. When the substituents are two, linked together, can form a ring adjacent to the thiophene ring; for instance two alkoxy groups can form a dioxane group. According to a particularly preferred embodiment of the present invention, the conductive polymer is just a polythiophene derivative wherein the two substituents form a dioxane ring: poly(3,4-ethylenedioxythiophene) commonly known with the acronym PEDOT, in form of complex with a dispersing agent, such as polystyrene sulphonate (PSS). Preferred conductive polymers according to the invention are the complexes commonly indicated with the acronym PEDOT:PSS, wherein the weight ratio of the two components can be comprised between 1/2.5 and 1/20, and it is for example equal to 1/2.5 as in the commercial products Clevios™ PAG, Clevios™ PH1000, and Clevios™ Pjet700 (H. C. Starck GmbH, Leverkusen, Germany) respectively.

According to a preferred embodiment of the present invention the conductive polymer is doped by addition of a doping agent selected for instance in the group consisting of ethylene glycol, diethylene glycol, 1,3-butandiol, dimethylsulphoxide, N-methylpyrrolidone, and polyalcohols, preferably selected from glycerol, erythritol, mannitol, sorbitol, arabitol and xylitol, in amount typically comprised between 1 and 10% by weight with respect to the total weight of the solution of conductive polymer. The dried films obtained after addition of doping agents to the solution of conductive polymer show in fact a particularly high conductivity, up to approximately 500 S $cm^{-1}$. Preferred doping agent according to the invention are selected from between 1,3-butandiol and dimethylsulphoxide. In particular, 1,3-butandiol is an additive commonly used in the cosmetic formulations, whose dermatologic compatibility is known and reported in the literature; therefore, it is particularly suitable for the preparation of films intended for applications where the film is in contact with the skin. According to a particular embodiment of the present process, DMSO is used as doping agent in order to form a mono-layer film having a particularly small thickness prepared by using a speed of the gravure roll ranging between about 15 and about 35 rpm.

The release of the films prepared by the present process may be carried out by dissolution of the sacrificial layer in a suitable solvent, the film may be transferred then into water, in other liquids or on any supports for example by aspiration and expulsion with a pipette, without any damages to the film; or the release may be achieved by mechanical detachment from the layer of support, in this latter case the film, once detached and wetted with water, may be transferred onto any desired surface in such a way as the temporary tattoos are transferred. In the photographic sequence shown in FIG. 2 here attached are illustrated for instance the detachment and transfer on human skin of the film obtained by the present R2R process: in this sequence it is shown how the adhesive tape is placed on the sides of the film of PEDOT:PSS and PDLLA supported on PP then, with the help of tweezers, the bi-layer film is detached from the substrate obtaining a free-standing film with adhesive tape on the sides (pictures a-c). Then the film is first temporarily transferred on a piece of nylon fabric that allows the subsequent detachment and transfer of the bi-layer film on the skin by wetting its surface with water and transferring it as it was a temporary tattoo (pictures d-f). The electric contact with the bi-layer film is obtained thanks to a copper tape and the resistance on the film is measured with a voltmeter (pictures g-h). The FIG. 3 here attached shows the possibility to obtain films having much larger size by the present R2R process.

The films obtained by the process of the invention may be then re-deposited on solid substrates of various nature and geometry, both soft and rigid, depending on the application required, for example on substrates of glass, paper, steel, metals, plastic, elastomers, fabrics, but also on human skin, showing in any case—even when the surface has a complex topography and non-planar forms—an excellent adhesion, because the high flexibility and the nanometric thickness of the films allow them to adapt to micro-roughness and porosity on the surface of the materials. The deposition on such substrates may be carried out directly or by means of perforated small nets made of metal wire, avoiding the complete drying of the film before its deposition on the substrate. Only at this moment the drying is carried out, for example by a jet of compressed air and/or thermal treatments, in order to eliminate any residues of water from the surface and to achieve the adhesion to the substrate that will be finally complete. Once deposited on the substrate, the film may be also cut with a special metal blade.

The process of the invention allows therefore to obtain polymer films, strong, having a limited degradability in time, homogeneity and conductive electric properties, and of the desired dimensions, with a thickness typically comprised between 30 and 300 nm and preferably comprised between 45 and 100 nm for the mono-layer films, and comprised between 100 and 400 nm and preferably between 150 and 350 nm for the bi-layer films; the films obtainable by the process of the invention have moreover a large surface, comprised for example between 1 and 20.000 cm$^2$, and preferably between 1 and 100 cm$^2$, for the free-standing film, they can get up to 100 m$^2$ and more for the film deposited on a suitable substrate. Inside these ranges the thickness of the present polymer films can be varied according to the needs, by varying some parameters of the process, such as the rotation speed of the gravure roll in the step of R2R deposition or the concentration and type of polymers used. In general, the films obtainable by the process of the invention are herein defined as films of "sub-micrometric" thickness; by this term it is meant that the thickness of the present films is below the micrometre, typically of some hundreds of nanometres, and preferably the thickness is below 100 nm, the present films being thus in this case nanofilms.

The films obtained by the present process have furthermore great resistance and chemical and structural stability when released in the form of free-standing films; in particular, thanks to the present process, their release from the temporary support and the transfer in water, in biological fluids or on other substrates depending on the desired application does not compromise the stability and integrity also of polymeric films having a large surface area.

Thanks to these characteristics, the films of the present invention have several applications, such as in the field of the development of novel sensors and actuators, as "smart materials" in the locomotion of micro- and meso-scale objects in water or other biological fluids, in the manufacture of multi-layer and/or multifunctional structures, in the deposition of sub-micrometric conductive films on micro-manufactured artifacts, on human skin, on biological samples or on other items characterised even by non-planar and complicated geometries.

These films may be used as substrates for the adhesion, the growth, the differentiation and the electric and mechanical stimulation of cells, also to develop actuators and bio-hybrid devices. The possibility of electrical conductibility guarantees in fact the direct and controlled stimulation of the muscle cells, making the films of the invention suitable as components for preparing in vitro muscles and for the development of novel bio-hybrid devices.

Further important applications of the present films are in the manufacture of wearable electronic devices and of flexible electronic devices having a large surface area.

The following examples are provided with the aim of giving a non-limiting illustration of the present invention.

Example 1

Preparation of a Monolayer Film of PEDOT:PSS, Pristine or Doped

A mono-layer film of PEDOT:PSS was prepared by using the R2R technique described above according to the following procedure that includes the formation of a sacrificial layer of cellulose acetate. A solution of cellulose acetate in acetone of concentration equal to 20 mg/ml was deposited on a film of polyethylene (in the following PET) with a thickness of 25 μm marketed by Toray under the trademark Lumirror® T60, by a R2R technique with a rotation speed of the gravure roll of 30 rpm and a speed of the line of 1.3 m/minute; then the deposited layer was dried at 80° C. with an air flow included in the R2R line. The film of PET coated with a layer of cellulose acetate is thus obtained in form of a roll, after its recovery by winding on a coil. An aqueous dispersion of PEDOT:PSS marketed under the trademark Clevios™ PH 1000 (H.C. Starck GmbH, Leverkusen, Germany), consisting of an aqueous dispersion of PEDOT/PSS wherein the weight ratio PEDOT/PSS is equal to 1/2.5, was filtered on a filtration membrane Millex, Millipore, having average size of the pores of 0.8 μm; then, the filtered dispersion was mixed with a non-ionic fluorosurfactant marketed under the trademark Zonyl® FS-300 (laboratory grade, Sigma-Aldrich), and maintained at room temperature under stirring for 8 hours before being deposed on the dried layer of cellulose acetate, always by a R2R process with a constant speed of the line equal to 0.2 m/minute and rotation speed of the gravure roll of 25 rpm. The film obtained was then subjected to a short thermal treatment at 130° C. with a flow of hot air integrated with the R2R line, before being re-winded. The roll of the so obtained film was then put in oven for a further thermal treatment for 15 minutes at 140° C. The films of PEDOT:PSS were finally obtained by immersion in acetone until complete dissolution of the sacrificial layer of cellulose acetate.

The preparation described above was repeated in a completely analogous way, but adding to the aqueous dispersion of PEDOT:PSS also DMSO in a first experiment and BG in a second experiment as doping agents, in both cases in concentration equal to 5% by weight with respect to the total weight of the solution.

The procedure described above was moreover repeated by varying the speed of the gravure roll in order to obtain films of different thickness, both with the pure conductive polymer and with the conductive polymer doped with DMSO or with BG, in each case carrying out different experiments with the following values of speed of the gravure roll: 5 rpm, 15 rpm, 35 rpm and 45 rpm.

Example 2

Preparation of Bi-Layer Films of PEDOT:PSS, Pristine or Doped, and PDLLA

A bi-layer film of PEDOT:PSS and PDLLA was prepared by using the R2R technique described above according to the following procedure. A solution of PDLLA (PM=330-600 kDa, marketed by Polysciences Inc.) in ethyl acetate was prepared having a concentration of 1% by weight of PDLLA with respect of the total weight of the solution. This solution was deposited on a polypropylene film (in the following PP) with a thickness of 40 µm, marketed under the trademark TORAYFAN® 2500H, by a R2R process with a rotation speed of the gravure roll of 25 rpm and with a speed of the line of 1.3 m/minute; then the layer deposited was dried with a flow of air at 80° C. The PP film coated with a layer of PDLLA was obtained in the form of a roll following winding on a coil. An aqueous dispersion of PEDOT:PSS marketed under the trademark Clevios™ PH 1000 (H.C. Starck GmbH, Leverkusen, Germany), consisting of an aqueous dispersion of PEDOT:PSS wherein the weight ratio PEDOT/PSS is equal to 1/2.5, was filtered on a filtration membrane Millex, Millipore, having average size of the pores of 0.8 µm; then, the filtered dispersion was mixed with a non-ionic fluorosurfactant marketed under the trademark Zonyl® FS-300 (laboratory grade, Sigma-Aldrich), and maintained at room temperature under stirring for 8 hours before being deposited on the layer of hardened PDLLA prepared as said above, always by a R2R process with a rotation speed of the gravure roll of 25 rpm and speed of the line of 0.2 m/minute. The drying was then carried out with an air jet in the R2R line, heated at the temperature of 130° C. It was then carried out a treatment in oven at 110° C. on the re-winded roll, after that the film consisting of the two coupled layers of PEDOT:PSS and PDLLA was detached from the PP substrate, favouring the detachment thanks to an adhesive tape at the ends of the film.

The procedure above described was repeated in a completely analogous way but starting from different concentrations of PDLLA in ethyl acetate, and in particular from concentrations equal to 1.5% and 2% by weight with respect to the total weight of the solution.

Then the preparations at each different concentration of PDLLA were repeated by adding to the aqueous dispersion of PEDOT:PSS also dimethyl sulphoxide (in the following DMSO) in a first experiment and butylene glycol (in the following BG) in a second experiment, as doping agents, in both cases in concentration equal to 5% by weight with respect of the total weight of the solution.

Example 3

Characterization of the Film Thickness

The films prepared as described above have been subjected to measurements of the thickness by atomic-force microscopy with the equipment MFP-3D-BIO, Asylum Research Co., Santa Barbara, Calif., operating under a tapping mode. The measurements were carried out under air, at room temperature, on film samples collected on silicon wafers. For the mono-layered film of Example 1, they were collected on the silicon wafer after release in acetone; for the bi-layered film of Example 2, they were collected on the silicon wafer after release from the support layer taking the care of wetting with water the film surface in order to increase the adhesion with the wafer, then they were dried by using a compressed air gun. On the surface of each analysed film a scratch was made with a needle, then the surface was scanned with the Atomic Force Microscope (AFM) in a perpendicular direction with respect to the scratched edge in an area of approximately 20×20 µm² thus measuring the height of the edge profile and obtaining therefrom the thickness of the film.

The graph in FIG. 4 the trend of the so measured values of thickness of the monolayer films of Example 1 at variations of the speed of the gravure roll during the R2R deposition of the layer of conductive polymers. More specifically, in FIG. 4 three series of values are shown respectively corresponding to: monolayer films of pristine conductive polymers (-•-); monolayer films of conductive polymers doped with BG (-○-) and monolayer films of conductive polymers doped with DMSO (-□-) all three tested in the range of speed of rotation of the gravure roll of Example 1 comprised between 5 and 45 rpm.

The results shown in FIG. 4 indicate for the monolayer films of pure polymers a linear increase of the thickness going from 5 to 25 rpm, whereas beyond this value of speed a plateau is reached that, up to 45 rpm, is maintained around an average value of about 200 nm. An analogous trend is observed for thickness of the monolayer films of polymers doped with BG, while for the monolayer films of polymers doped with DMSO a linear increase of the thickness is observed as the speed of the gravure roll increases up to 35 rpm. In this case, for higher values of the speed of the gravure roll, a measure of the average thickness of the film was not feasible, because the film was not homogeneous; for speed values comprised between 15 and 35 rpm this film of polymers doped with DMSO has on the contrary shown lower values of the thickness of the film with respect to the other two types of monolayer films tested.

An analogous evaluation of the thickness of the films were carried out for the bilayer films prepared as described above in Example 2 too; in this case the thickness of the films of conductive polymers were maintained fixed, while it was varied the thickness of the layer of PDLLA using three solutions at different concentrations of PDLLA, equal to 1%, 1.5% and 2% by weight. The graph in FIG. 5 shows the trend of the measured values of the thickness of the films as the concentration of PDLLA varies. More specifically, in FIG. 5 are shown three series of values respectively corresponding to: comparison films of PDLLA only (-•-) bilayer films of conductive polymers doped with BG and PDLLA (-○-) and bilayer films of conductive polymers doped with DMSO and PDLLA (-□-) all three tested in the range of concentration of PDLLA indicated above. As evident in FIG. 5, and as expected, the thickness of the film in any case increases linearly as the concentration of PDLLA increases.

Example 4

Electric Characterization of the Films

The films according to the invention prepared as described above in Examples 1 and 2 were moreover subjected to electric characterization, carried out by the four tips method on film samples cut in form of squares with size of 1.5 cm. It was so measured the surface resistance $R_S$ of the film samples and the corresponding conductivity $\sigma$ was calculated by using the following formulae:

$$R_S = \pi/\ln 2 \cdot (V/i) \text{ and } \sigma = 1/R_S \cdot t$$

wherein t is the thickness of the film.

The conductivity was evaluated on all series of monolayer films of conductive polymers pristine and doped of Example 1 having different thickness as a consequence of different speeds of the gravure roll used during the R2R deposition process. Results of the measurements are reported in FIG. 6: as noticeable, the conductivity of the monolayer films of pure conductive polymers increases slightly as the thickness of the film increases, while the conductivity strongly increases—an increase of three orders of magnitude is observed—for the corresponding monolayer films of conductive polymers doped with BG or with DMSO, like the results reported in the literature for similar supported materials.

Example 5

Characterisation of the Adhesive Properties of the Films

The adhesion force of the films was measured with a scratch tester for thin films, model CSR-02, Rhesca, Tokio, using the following procedure: a diamond tip with curvature of 100 μm was loaded in a continuous mode and in vertical position with a speed of 10 mN/minute, and used for horizontally scratching the films of Examples 1 and 2 re-absorbed on $SiO_2$ substrates (length of the scratch: 100 μm, speed of the scratch: 10 mm/second), until the detachment of the film from the substrate occurs. The equipment used emits an acoustic vibration signal after rupture of the film, to indicate that a critical load was applied. The values of critical load were normalised dividing the values obtained by the thickness of the film. The adhesion properties were evaluated investigating the relationship between the critical load required to obtain the detachment of the film from the substrate and the thickness of the film itself using what the scratch tester had detected. These experiments were carried out on both the monolayer films of Example 1 and on the bilayer films of Example 2 on both sides, i.e. on the side of the conductive polymers and on the side of PDLLA. The images obtained with the tester were then evaluated, an example of these images is illustrated in FIG. 7, where in the part a) is illustrated the image obtained for a monolayer film of non-doped conductive polymers, adhered on a silicon wafer, and in the part b) is shown the image obtained for a bilayer film on the side PDLLA.

The trend in the adhesion force in these experiments showed an increase of the force as the thickness diminished for both the monolayer and the bilayer films. For the free-standing films of thickness lower than 100 nm was observed a higher potential to adhere to different substrates without the addition of any kinds of reagents; then this ability to adhere strongly diminished as the thickness increased. As far as the bilayer film with PDLLA is concerned, as shown in FIG. 8, the critical load on the side of the film of PDLLA varied between about 44000 N/m for films of thickness of approximately 70 nm and about 20000 N/m for thickness of approximately 190 nm. Instead, for monolayer films of PEDOT:PSS an higher critical load was found than that for the bilayer films on the side PDLLA. Likewise, as noticeable by a comparison of the data in the FIGS. 9 and 10, an higher critical load was found for the bilayer films of PEDOT:PSS and PDLLA for the side of the conductive polymers than that found for the side of PDLLA, and the difference between the two sides increases as the thickness of the side of PDLLA increases.

The invention claimed is:

1. A process for the preparation of free-standing films, comprising at least a surface layer of a conductive polymer, comprising:

a) depositing of a layer of a first polymer on a temporary support, wherein said deposition is carried out by a roll-to-roll technique starting from said temporary support in the form of a film and from a solution of said first polymer, and drying of the so-obtained film consisting of said temporary support and of said layer of said first polymer;

b) depositing of a layer of a second polymer on said film obtained in step a), wherein said deposition is carried out by the roll-to-roll technique starting from the film of step a) and from an aqueous solution or dispersion of said second polymer, and said second polymer is a conductive polymer, and drying of the so-obtained film consisting of said temporary support, said layer of said first polymer, and said layer of said second polymer; and c) detaching of said temporary support from the film coming from step b) by dissolving said layer of said first polymer by immersion in a solvent and consequent release of a mono-layered free-standing film of said second conductive polymer, or by peeling off said layer of said first polymer from said temporary support and consequent release of a bi-layered free-standing film of said first polymer and said second conductive polymer, wherein said layer of a first polymer is a layer of poly (D,L-lactic acid) that is detached in said step c) from said temporary support by adhesive tapes placed on the sides of said free-standing film.

2. The process according to claim 1, wherein said solution of said second conductive polymer in step b) comprises, besides said conductive polymer, a doping agent selected from the group consisting of ethylene glycol, diethylene glycol, 1,3-butandiol, dimethylsulphoxide, N-methylpyrrolidone, and polyols, added in an amount ranging from 1 to 10% by weight with respect to the total weight of said solution of said second conductive polymer.

3. The process according to claim 2, wherein said polyols are selected from the group consisting of glycerol, erythritol, mannitol, sorbitol, arabitol and xylitol.

4. The process according to claim 1, wherein said solution or dispersion of the second conductive polymer in step b) further comprises a surfactant in amount of between 0.01 and 10% by weight with respect to the total weight of said solution or dispersion of the conductive polymer.

5. The process according to claim 1, wherein said conductive polymer is poly(3,4-ethylenedioxythiophene) (PEDOT) in the form of a complex with a dispersing agent.

6. The process according to claim 5, wherein said dispersing agent is polystyrene sulphonate (PSS).

7. The process according to claim 6, wherein the weight ratio PEDOT/PSS is 1/2.5.

8. The process according to claim 1, wherein said temporary support in form of a film is selected from the group consisting of a poly(propylene) film, a poly(ethylene terephthalate) film, and a poly(ethylene naphthalate) film.

9. The process according to claim 1, wherein said drying in step a) is carried out by treatment with air flow at a temperature of about 80° C.

10. The process according to claim 1, wherein said drying in step b) is carried out by treatment with air flow at a temperature of about 130° C.

11. The process according to claim 1, further comprising recollecting said free-standing film coming from step c), and optionally transferring it in liquid media or on solid supports.

12. The process according to claim 1, wherein said free-standing film obtained in step c) has a thickness of between 30 and 300 nm for the mono-layered film and a thickness of between 100 and 400 nm for the bi-layered film, and a surface area of between 1 and 20000 cm².

13. The process according to claim 12, wherein said thickness of said free-standing film is of between 45 and 100 nm for the mono-layered film and is of between 150 and 350 nm for the bi-layered film.

14. The process according to claim 1, wherein said deposition by the roll-to-roll technique in step b) is carried out by a gravure roll having an engraved texture on its surface, which is transferred onto the film of said second polymer.

15. An intermediate in the process as defined in claim 1 for the preparation of free-standing films comprising at least a surface layer of a conductive polymer, said intermediate being a film comprising a temporary support film, a layer of said first polymer and a layer of said second polymer in the form of a roll after recovery by winding the film on a reel in step b) of the above said process.

* * * * *